US011072941B1

(12) United States Patent
Oliphant et al.

(10) Patent No.: US 11,072,941 B1
(45) Date of Patent: Jul. 27, 2021

(54) LOAD TRANSFER ARRANGEMENT

(71) Applicant: Exo Group LLC, Magnolia, TX (US)

(72) Inventors: Wesley J Oliphant, Magnolia, TX (US); Zachary J Oliphant, Magnolia, TX (US); Garett W Oliphant, Magnolia, TX (US)

(73) Assignee: Exo Group LLC, Magnolia, TX (US)

( * ) Notice: Subject to any disclaimer, the term of this patent is extended or adjusted under 35 U.S.C. 154(b) by 12 days.

(21) Appl. No.: 16/512,906

(22) Filed: Jul. 16, 2019

Related U.S. Application Data

(60) Provisional application No. 62/701,874, filed on Jul. 23, 2018.

(51) Int. Cl.
| | | |
|---|---|---|
| *E04H 12/00* | (2006.01) | |
| *E04H 12/34* | (2006.01) | |
| *B23P 6/00* | (2006.01) | |
| *E04H 12/08* | (2006.01) | |

(52) U.S. Cl.
CPC ............. *E04H 12/342* (2013.01); *B23P 6/00* (2013.01); *E04H 12/08* (2013.01)

(58) Field of Classification Search
CPC ..... E04H 12/342; E04H 12/00; E04H 12/085; E04H 12/34; E04H 12/344; B23P 6/00; E04G 23/0225; E04G 21/24; E04G 21/32; F03D 11/04
USPC .................... 403/300; 52/835, 836, 840, 848
See application file for complete search history.

(56) References Cited

U.S. PATENT DOCUMENTS

| | | | | |
|---|---|---|---|---|
| 2,707,034 A | * | 4/1955 | Hetrick .................. | E04H 12/00 52/835 |
| 4,048,779 A | * | 9/1977 | Valenziano .............. | E02D 5/64 52/849 |
| 4,654,612 A | * | 3/1987 | Smith ...................... | H01P 1/00 248/59 |
| 4,934,675 A | * | 6/1990 | Klocke ................... | B25B 1/205 269/111 |
| 8,056,297 B2 | * | 11/2011 | Mathai .................... | E04H 12/08 52/651.01 |
| 8,209,913 B2 | * | 7/2012 | Murata ................... | E04H 12/08 52/40 |
| 9,822,537 B2 | * | 11/2017 | Garcia .................... | F03D 13/20 |
| 2004/0020158 A1 | * | 2/2004 | Kopshever, Sr. ......... | E04C 3/30 52/835 |
| 2006/0123735 A1 | * | 6/2006 | Fuellhaas ................ | F03D 13/20 52/741.13 |
| 2010/0126115 A1 | * | 5/2010 | Lim ...................... | G01M 5/0083 52/848 |
| 2011/0138729 A1 | * | 6/2011 | Shiraishi ............... | E04H 12/085 52/651.01 |
| 2011/0140446 A1 | * | 6/2011 | Knoop ................... | F03D 80/85 290/55 |

* cited by examiner

*Primary Examiner* — Paul T Chin
(74) *Attorney, Agent, or Firm* — Duncan Galloway Egan Greenwald PLLC; Theresa Camoriano; Guillermo Camoriano

(57) ABSTRACT

An arrangement for making a field repair on a multi-part pole having upper and lower walls joined together by a flanged connection, wherein the welds on the flanged connection are beginning to show signs of failure. The arrangement includes a bracket having a substantially "U"-shaped central portion which spans the flanged connection, and upper and lower elongated portions extending from the central portion, lying flush against and secured to the upper and lower walls of the pole, respectively.

8 Claims, 5 Drawing Sheets

US 11,072,941 B1

LOAD TRANSFER ARRANGEMENT

BACKGROUND

The present invention relates to a device and method to repair or reinforce a multi-part pole, wherein a flanged connection between adjacent upper and lower sections of the pole has been weakened.

For example, utility companies have power transmission poles that support power lines and that have weld cracking in the welds that connect the flanges to the pole sections. It is very expensive to replace the poles and very expensive to try to repair all of the welds, especially since the power lines are energized, and the poles hold tension from the wires and from the wind loads acting on them.

SUMMARY

One-piece brackets are provided, with each bracket having elongated upper and lower portions that are secured to the upper and lower walls of the multi-part pole using blind fasteners, and with each bracket having a central portion that spans across the weakened flange area. There is no need for welding in the field. The brackets support the forces that previously were supported by the failing flange weld, effectively bypassing the welds and flanges.

DESCRIPTION

Figure 1:
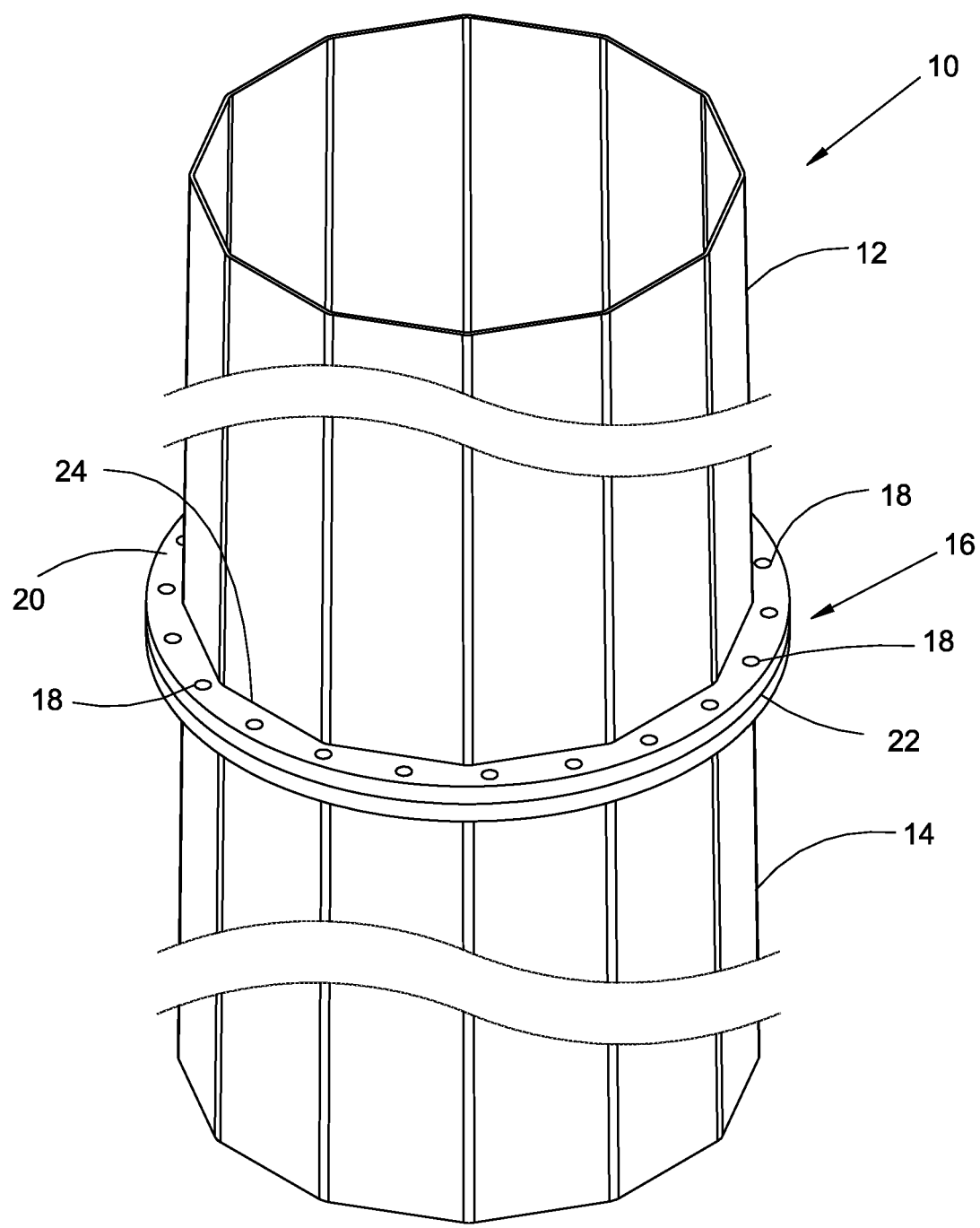
FIG. 1 is a broken-away, perspective view of a prior art multi-part, multi-sided pole showing an upper wall and a lower wall with a flanged connection between the upper and lower walls.

FIG. 1 is a broken-away perspective view of a hollow, multi-sided pole 10 including an upper pole wall 12, a lower pole wall 14, and a flanged connection 16 at the juncture of the upper and lower pole walls 12, 14. In this particular embodiment, the pole 10 is a 12-sided metal pole having 12 flat sides. The flanged connection 16 includes an upper flange 20, a lower flange 22, and a plurality of bolts 18 that secure the flanges 20, 22 together. The upper flange 20 is welded to the lower end of the upper pole wall 12, and the lower flange 22 is welded to the upper end of the lower pole wall 14. Bending moments, due to factors such as wind loading as well as the weight of any items which hang off of or are otherwise supported by the pole 10, are transmitted from the upper pole wall 12 to the lower pole wall 14 via the welds 24 between upper and lower pole walls 12, 14 and their corresponding upper and lower flanges 20, 22.

After years of use, or due to inherent defects, these welds 24 may begin to crack and eventually fail. When a field inspection indicates that the welds 24 are beginning to crack, a plurality of one-piece brackets 26 as described below can be installed in the field to effectively replace the flanges 20, 22 and the welds 24 by providing another mechanism for supporting and transferring the forces.

Figure 2:
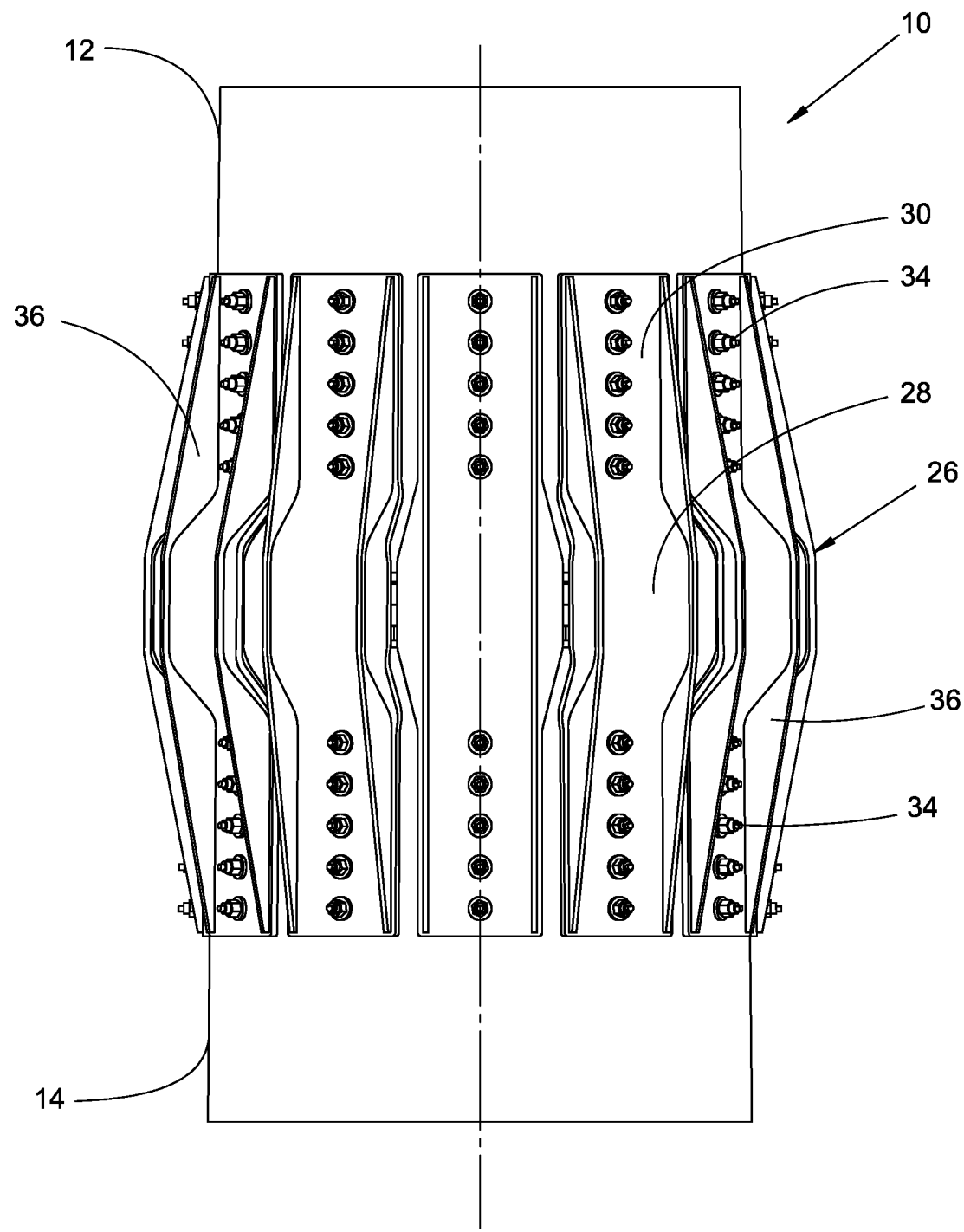
FIG. 2 is a side view of the pole of FIG. 1 with a plurality of load transfer brackets mounted on the pole.

FIG. 2 is a side view of the pole 10 of FIG. 1 with a plurality of one-piece brackets 26 installed, each bracket 26 spanning across the flanged connection 16, which cannot be seen in this view. The brackets 26 are identical to each other. A perspective view of one of the brackets 26 is shown in FIG. 5.

Figure 3:
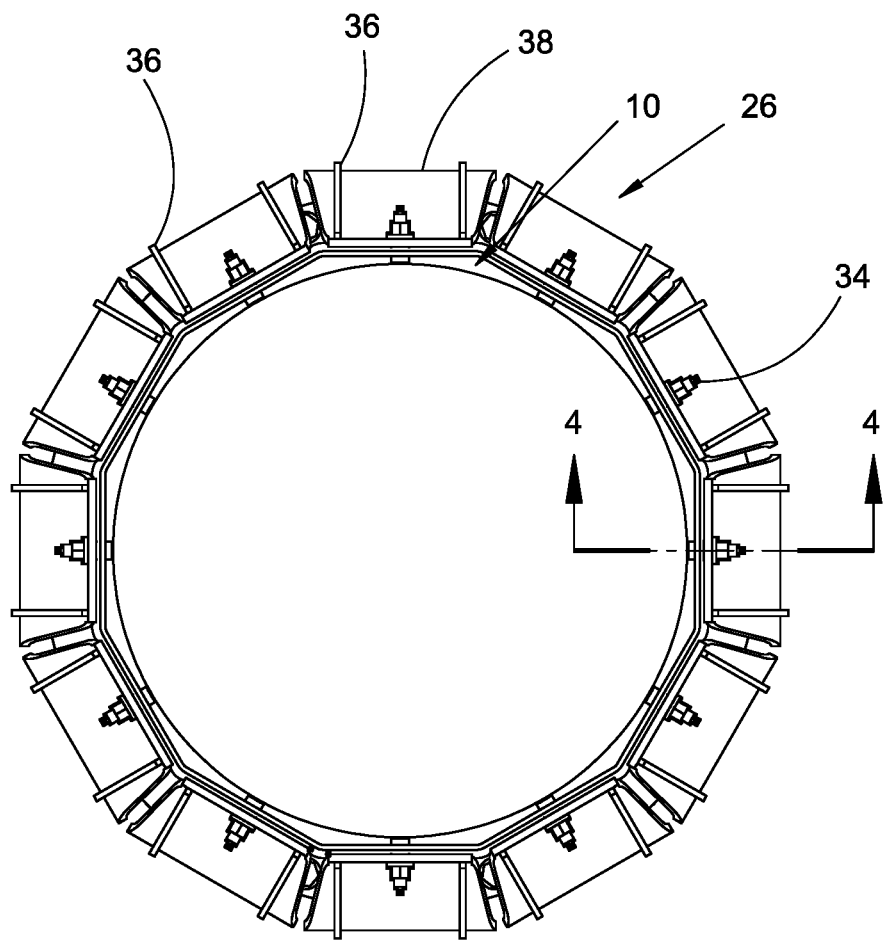
FIG. 3 is a top view of the pole of FIG. 2.

As best appreciated in FIG. 3, there are 12 brackets 26 mounted on the 12-sided pole 10, with one bracket 26 mounted on each of the 12 sides of the pole 10. Each bracket 26 is secured to the upper and lower walls 12, 14 along its respective side. It should be pointed out that it is not always necessary that there be a bracket 26 for each side of the pole. For instance, it would be possible to provide only 6 brackets 26 for the pole 10, wherein only every other side of the pole 10 receives a corresponding bracket 26. However, it is preferred that there be a bracket 26 on every side of a multi-sided pole. Of course, these brackets 26 could be used on poles with greater or fewer than 12 sides. They also could be used on circular cross-section poles. In that case, the rear surfaces of the upper and lower elongated portions of the bracket preferably would be curved to match the shape of the surfaces against which they are secured.

Figure 4:
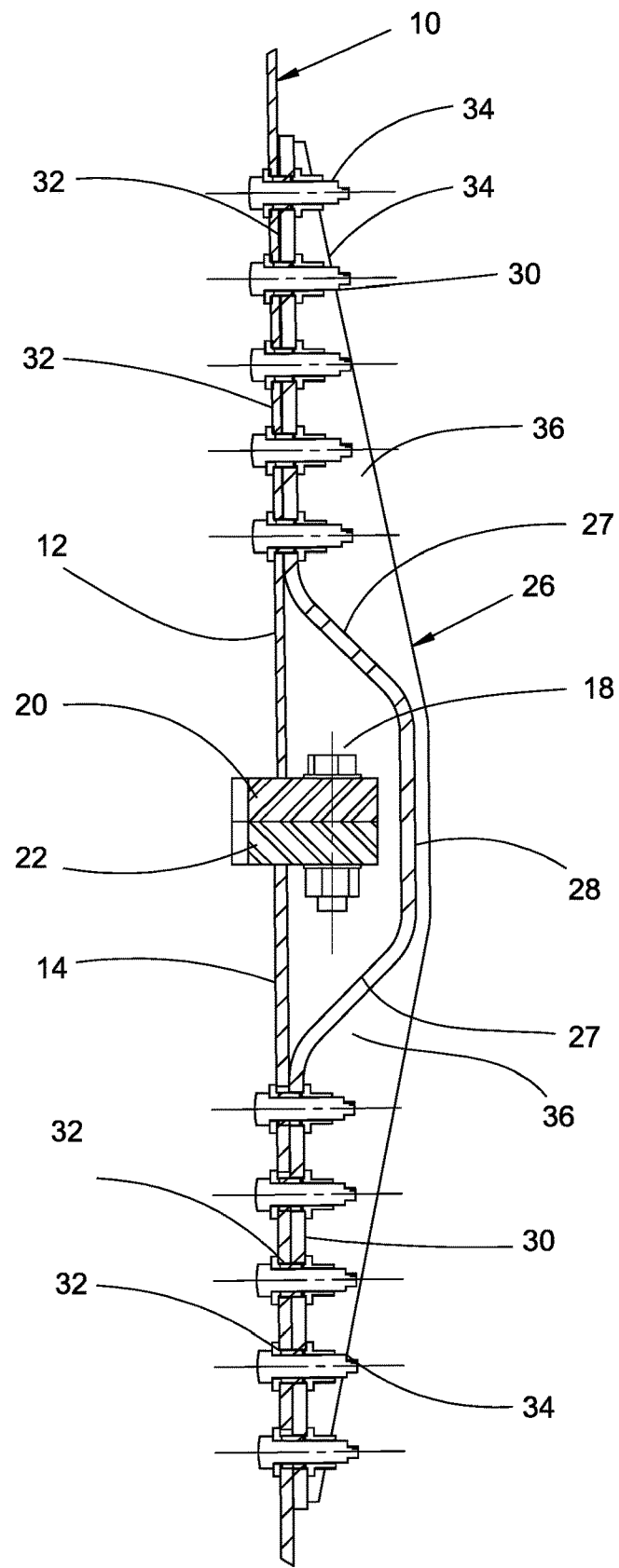
FIG. 4 is a view along section 4-4 of FIG. 3.
Figure 5:
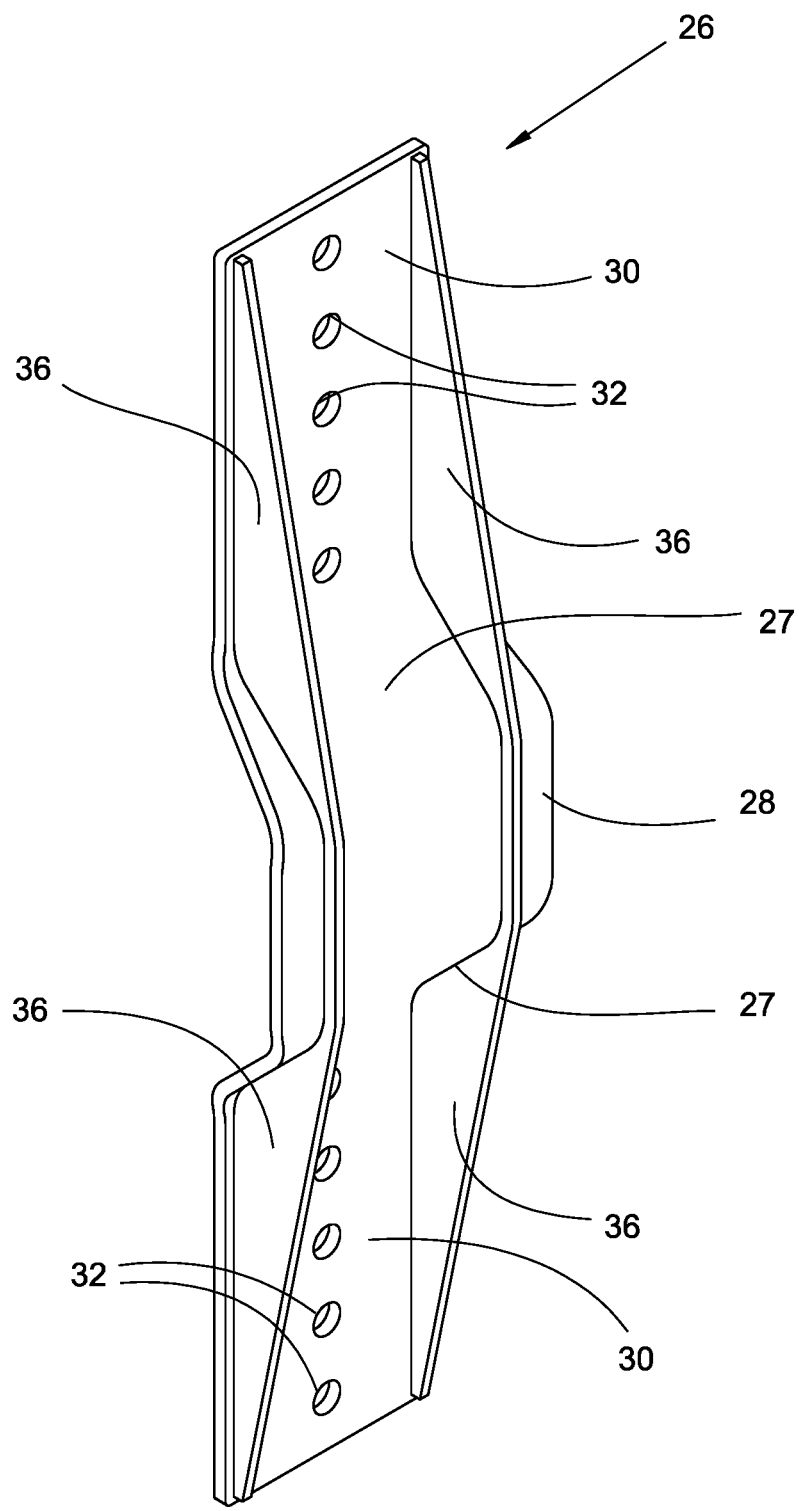
FIG. 5 is a perspective view of the load transfer bracket of FIG. 4.

As best appreciated in FIGS. 4 and 5, the bracket 26 has symmetrical upper and lower elongated portions 30, which are flat on the rear surface in order to lie flat against the upper and lower walls 12, 14 on one side of the multi-sided pole 10. (If the pole or other structure had a curved outer surface, the brackets 26 would be made with a rear surface that matched that curved shape in order to lie flush against the outer surface of the structure.) The bracket 26 has a U-shaped central portion 28, which spans over the flanges 20, 22 when the upper and lower elongated portions 30 are lying flush against the respective upper and lower walls 12, 14 on one side of the pole 10. The upper and lower elongated portions 30 define a plurality of through openings 32 for securement of the bracket 26 to the pole 10 via blind fasteners 34, as explained in more detail later.

On the front face of the bracket 26, left and right gussets 36 extend along the upper and lower elongated portions 30 and along the central U-shaped portion 26, including the legs 27 and the flat base 28. The gussets 36 are part of the one-piece bracket 26 and are secured to the main body of the bracket 26 along their full length to provide additional stiffening to the bracket 26 to provide support against the forces acting on the bracket 26.

Each of the upper and lower elongated portions 32 of the bracket 26 defines a plurality of through-openings 32. To install the bracket 26 to the pole 10, the bracket 26 is put into position on the pole 10, and a first hole is drilled on the upper pole wall 12 at the location of the uppermost opening 32 in the bracket 26.

Note that the drilling of this first hole through the upper pole section 12 of the pole 10 can be aided by the use of a magnetic base drill. Once this first hole is drilled, a first blind fastener 34 is installed through the upper opening 32 of the bracket 26 and through the first drilled hole in the upper pole wall 12 to hang the bracket 26 onto the pole 10. This positions the bracket 26 on the pole 10. Then, the remaining holes 32 of the bracket 26 are used as a template to accurately locate the additional holes to be drilled in both the upper and lower pole walls 12, 14. Once the positions of these additional holes have been located, the magnetic base drill is used to readily drill the holes through the upper and lower walls 12, 14, and the bracket 26 is secured to the pole 10 using the blind fasteners 34. This process is repeated until all the brackets 26 have been installed.

It should be noted that, by using a plurality of individual one-piece brackets 26, a wide range of pole types and sizes can be reinforced using just a single style of bracket. This is advantageous, as it is not as practical to carry a large number of different types of brackets into the field.

Blind fasteners 34 are used for the installation, because the installer usually does not have access to the inner surface of the hollow pole 10. Blind fasteners usually are multi-piece assemblies, which can be installed and tightened from one side of the workpiece. Typical examples of blind fasteners used in higher strength structural areas are Ajax™ bolts (manufactured by Ajax Fasteners of Australia) and ForgBolts™ (manufactured by Paul J. Ford and Company of Columbus, Ohio) and are well known in the industry. Other types of blind fasteners are known in the art. The blind fasteners should be installed and evenly tightened in accordance with the manufacturer's specifications, alternating between top and bottom holes.

It should be noted that the existing flanged connection 16 and all of its bolts 18 remain untouched during the installation of the brackets 26, so there is no need to add external supports to the pole 10 or to the load it is bearing during the repair.

Each bracket 26 can be hoisted from a small portable winch (or perhaps even by hand) on the ground with a rope run through a block strapped to the pole just above the installation location. In the case of power transmission lines, the line may even remain energized if properly trained personnel are used to install the brackets 26. Finally, there is no need for welding or grinding on a heavily loaded structure when making the repair using the bracket 26. This is a more permanent solution than trying to continue to monitor and repair the myriad known welding issues on these structures.

The bracket 26 is made of a material which is most appropriate for the application. For instance, it may be made out of steel, aluminum, or even a composite such as fiberglass or carbon fiber. It should be noted that the one-piece bracket 26 may be a welded assembly, a unitary casting, or may be formed in other known ways.

While the embodiment described above shows one example of a bracket for making a field repair on a flanged structure, it will be obvious to those skilled in the art that modifications may be made to the embodiment described above without departing from the scope of the present invention as claimed.

What is claimed is:

1. An arrangement for transferring forces across a flanged connection of a multi-piece pole having an upper wall above the flanged connection and a lower wall below the flanged connection, comprising:

a plurality of one-piece brackets, each having a rear face and a front face and including upper and lower elongated portions and a U-shaped portion between said upper and lower elongated portions, the rear face of said U-shaped portion being adapted to span over the flanged connection when the rear faces of the upper and lower elongated portions are lying flush against the upper and lower walls of the multi-piece pole;

wherein each of said upper and lower elongated bracket portions defines a plurality of through-openings for receiving fasteners to secure said upper and lower elongated bracket portions to the respective upper and lower walls; and wherein said front face includes left and right gussets extending along said upper and lower elongated bracket portions.

2. An arrangement for transferring forces across a flanged connection of a multi-piece pole as recited in claim 1, wherein said left and right gussets also extend along said U-shaped portion.

3. An arrangement for transferring forces across a flanged connection of a multi-piece pole as recited in claim 2, and further comprising a plurality of blind fasteners for extending through said through-openings to secure said plurality of one-piece brackets to the upper and lower walls.

4. An arrangement for transferring forces across a flanged connection of a multi-piece pole as recited in claim 3, wherein said rear faces of said upper and lower elongated portions are flat.

5. An arrangement for transferring forces across a flanged connection of a multi-piece pole as recited in claim 1, and further comprising a multi-piece pole having upper and lower walls and a flanged connection connecting said upper and lower walls together, wherein said one-piece brackets are secured onto said upper and lower walls, with the rear faces of said upper and lower elongated portions lying flush against said upper and lower walls, respectively, with the U-shaped portions spanning said flanged connection, and with a plurality of blind fasteners extending through said through-openings and through the respective wall of said pole to secure said upper elongated portion to said upper wall and said lower elongated portion to said lower wall.

6. An arrangement for transferring forces across a flanged connection of a multi-piece pole as recited in claim 5, wherein said multi-piece pole is multi-sided, and each of said one-piece brackets is secured along one of the sides of said multi-sided, multi-piece pole, with said rear faces of each of said upper and lower elongated portions of each of said one-piece brackets lying flat against the respective side of said multi-piece, multi-sided pole.

7. An arrangement for transferring forces across a flanged connection of a multi-piece pole as recited in claim 6, wherein one of said one-piece brackets is secured along each of the sides of said multi-sided, multi-piece pole.

8. An arrangement for transferring forces across a flanged connection of a multi-piece pole as recited in claim 7, wherein said left and right reinforcing gussets of said one-piece brackets also extend along the front face of said U-shaped portions.

* * * * *